(12) United States Patent
Wojanis

(10) Patent No.: US 6,467,553 B1
(45) Date of Patent: Oct. 22, 2002

(54) HYDRAULIC PLOW BALANCING SYSTEM

(76) Inventor: James R. Wojanis, 2045 McKees Rocks Rd., McKees Rocks, PA (US) 15136

( * ) Notice: Subject to any disclaimer, the term of this patent is extended or adjusted under 35 U.S.C. 154(b) by 15 days.

(21) Appl. No.: 09/650,593

(22) Filed: Aug. 30, 2000

Related U.S. Application Data

(60) Provisional application No. 60/152,409, filed on Sep. 3, 1999.

(51) Int. Cl.[7] .................................................. E02F 3/85
(52) U.S. Cl. ..................................................... 172/812
(58) Field of Search .................... 37/348, 382; 172/812, 172/819, 828, 830; 91/6, 33, 31; 60/494

(56) References Cited

U.S. PATENT DOCUMENTS

| | | | |
|---|---|---|---|
| 3,706,144 A | | 12/1972 | Miceli .............................. 37/42 |
| 4,024,710 A | * | 5/1977 | Zelle |
| 4,028,820 A | | 6/1977 | Simonds, Jr. ................... 37/41 |
| 4,074,448 A | | 2/1978 | Niemela ......................... 37/41 |
| 4,137,716 A | | 2/1979 | Budzich ....................... 60/445 |
| 4,258,484 A | | 3/1981 | Lansard .......................... 37/41 |
| 4,329,911 A | | 5/1982 | Schwerin ...................... 91/387 |
| 4,350,209 A | | 9/1982 | O'Connor ...................... 172/7 |
| 4,463,658 A | | 8/1984 | Heiser et al. .................. 91/388 |
| 4,660,380 A | | 4/1987 | Höfer et al. ................... 60/422 |
| 4,665,695 A | * | 5/1987 | Rau et al. |
| 4,665,801 A | * | 5/1987 | Budzich |
| 4,799,420 A | * | 1/1989 | Budzich |
| 5,024,140 A | * | 6/1991 | Gage |
| 5,044,446 A | * | 9/1991 | Jonasson et al. |
| 5,077,975 A | * | 1/1992 | Kauss |
| 5,265,356 A | | 11/1993 | Winter ......................... 37/234 |
| 5,515,879 A | | 5/1996 | Mollo .......................... 137/115 |
| 5,611,259 A | * | 3/1997 | Nagata |
| 5,809,862 A | * | 9/1998 | Dallman |
| 5,848,531 A | * | 12/1998 | Nakamura et al. |
| 6,164,385 A | * | 12/2000 | Buckl |

FOREIGN PATENT DOCUMENTS

| | | |
|---|---|---|
| GB | 2093676 | 9/1982 |
| JP | 247413 | 2/1990 |

OTHER PUBLICATIONS

*Would You Believe This Blade Will Plow Through Thousands of Storms*, Basic Technologies, two-page advertisement.
"*Central Hydraulic System Compu–Spread*" Drawing, Basic Technologies Corporation, May 25, 1992.

* cited by examiner

*Primary Examiner*—Victor Batson
(74) *Attorney, Agent, or Firm*—Webb Ziesenheim Logsdon Orkin & Hanson, P.C.

(57) ABSTRACT

An apparatus for balancing a plow including a balance circuit, a pump fluidly connected to the balance circuit, and a load sensing valve bank fluidly connected to the balance circuit in the pump, wherein the balance circuit generally includes a two-position solenoid valve, a two-position three way solenoid valve, a two-position four-way valve with detent, a counterbalance valve with reverse freeflow check, a pressure relieving valve, and a shuttle valve, the pump is a load sensing pump, and the load sensing valve bank includes a lift and lower valve.

13 Claims, 3 Drawing Sheets

HYDRAULIC PLOW BALANCING SYSTEM

CROSS-REFERENCE TO RELATED APPLICATION

This application claims the benefit of earlier filed U.S. Provisional Patent Application Serial No. 60/152,409, filed Sep. 3, 1999, entitled "Hydraulic Plow Balancing System."

BACKGROUND OF THE INVENTION

1. Field of the Invention

The present invention relates to hydraulic systems and, more particularly, to hydraulically controlling the amount of weight that a plow blade cutting edge bears on a surface to be plowed.

2. Background of the Prior Art

Road or grader plows are heavy pieces of equipment, often weighing 1500 or more pounds. A standard plow has a blade cutting edge, a second edge parallel to the blade cutting edge, and a concave and convex shaped body connecting the blade cutting edge with the second edge. The plow is generally mounted to a vehicle, such as a truck, with the blade cutting edge positioned adjacent a surface to be plowed, the concave shaped portion of the body facing away from a front side of a vehicle, and the second edge parallel to the surface to be plowed.

Generally, when a blade cutting edge of a plow is lowered onto a surface to be plowed, such as a concrete or asphalt road, the entire weight of the plow is distributed along the blade cutting edge of the plow. The weight of the plow on the blade cutting edge, combined with friction between the blade cutting edge and the surface being plowed, wears out the blade cutting edge of the plow, sometimes in as little as four hundred miles.

In an effort to increase the lives of plow blade cutting edges, which can be very expensive, balancing systems have been developed to reduce the amount of force exerted on the blade cutting edges of the plows. For example, U.S. Pat. No. 5,265,356 to Winter and Japanese Laid Open Publication No. 2-47413 generally disclose hydraulic systems that balance a front or mid-mounted plow.

One drawback of the prior art in general is powering balance circuits having a fixed volume pump that is PTO driven through the vehicle transmission. Because the fixed volume pump is keyed to the transmission, it must be disengaged during shifting. The result is uneven or disjointed load balancing as the transmission shifts gears and fluid pressure fluctuates. Heat is also a problem, due to the voluminous flow rate of hydraulic fluid through the pump at maximum system pressure and the corresponding horsepower draw from the engine.

SUMMARY OF THE INVENTION

To help solve the problems associated with the prior art, the present invention is directed toward a lifting, lowering, and balancing system for a plow generally including a balance circuit, a pump fluidly connected to the balance circuit, and a load sensing valve bank fluidly connected to the balance circuit and a pump, such a load sensing pump or other suitable device. An hydraulic cylinder positioned adjacent a plow vehicle is also fluidly connected to the balance circuit, the load sensing pump, and to the load sensing valve bank.

The balance circuit generally includes a two-position solenoid valve, a two-position three-way solenoid valve, a two-position four-way valve with detent, a counterbalance valve with reverse freeflow check, a pressure relieving valve, and a shuttle valve.

The load sensing valve bank generally includes a lift and lower valve, such as an all ports blocked load sensed proportional control valve, or a P blocked, A and B to T configuration valve. A drain line is fluidly connected to the relieving port of the pressure reducing relieving valve and a fluid reservoir or fluidly connected to the relieving port of the pressure reducing relieving valve, a fluid reservoir, and the shuttle valve. In the second instance, the drain line has a reduced internal diameter portion positioned between the relieving port of the pressure reducing relieving valve and the shuttle valve.

One method of balancing a plow, where the plow is attached to a hydraulic cylinder having a blind end and a port end, includes the step of:

a. pumping a non-compressible fluid into the blind end of the hydraulic cylinder to create a fluid force in the blind end of the hydraulic cylinder which is greater than zero pounds per square inch and less than an opposite force exerted on the non-compressible fluid in the blind end of the hydraulic cylinder by a weight of the plow. Pumping is generally accomplished using a pump, such as a load sensing pump fluidly connected to the hydraulic cylinder, to pump the non-compressible fluid into the blind end of the hydraulic cylinder.

Balancing a plow is generally accomplished by:

b. lowering the plow onto a surface; and
c. energizing the two-position valve.

Raising the plow while balancing includes the steps of:

d. engaging the lift and lower valve;
e. pumping fluid into the blind end of the hydraulic cylinder;
f. applying a pilot pressure to a second input of the two-position four-way valve; and
g. raising the plow with respect to a ground surface.

Lowering the plow while balancing includes the steps of:

h. activating the lift and lower valve;
i. applying a pilot pressure to a first input of the two-position four-way valve in the balance circuit;
j. pumping fluid into the rod end of the hydraulic cylinder;
k. removing the non-compressible fluid in the blind end of the hydraulic cylinder; and
l. lowering the plow toward a ground surface.

Turning off the balance circuit includes the step of:

m. disengaging the two-position valve.

When applied to load balancing plows, the present invention functions in conjunction with new or existing live power load sensed circuits and is generally designed to be used in conjunction with new or existing load sensing and gear pump central hydraulic systems. The present invention may be operated on new or existing single acting and double acting hydraulic cylinder circuits.

It is an object of the present invention to generally lessen friction between the blade cutting edge of a plow and the surface being plowed, thereby increasing blade cutting edge life.

It is a further object to allow a plow operator to raise a plow in an expedited manner while in the plow balance mode.

It is a still further object to help reduce fuel costs of the plow vehicles and to possibly permit plow vehicles to plow surfaces one or two gears higher than normal.

Because the entire weight of the plow is not resting on the blade cutting edge during balancing, it is another object of the present invention to generally cause less damage to patches, road markers, road shoulders, and softer surfaces such as gravel or dirt roads, lessen the impact to the vehicle when the plow encounters raised portions of concrete, and to help the plow follow the contours of the surface to be plowed.

It is yet another object of the present invention to transfer plow weight over the front axle of the vehicle, helping to improve steering.

These and other advantages of the present invention will be clarified in the Detailed Description of the Preferred Embodiments and the attached figures in which like reference numerals represent like elements throughout.

BRIEF DESCRIPTION OF THE DRAWINGS

FIG. 2 is a schematic view of a P blocked A and B to T type of load sensed proportional control valve;

FIG. 3 is a schematic view of a hydraulic system according to the present invention including a balance circuit, a load sensing valve bank, a load sensing pump connected to the balance circuit and the load sensing pump, and a hydraulic cylinder connected to the balance circuit and the load sensing valve bank;

FIG. 4 is a schematic view of the hydraulic system shown in FIG. 3, with a shuttle valve and reduced diameter drain line added to the balance circuit and a connection modification made to a plow lift and lower valve in the load sensing valve bank.

DETAILED DESCRIPTION OF THE PREFERRED EMBODIMENTS

Figure 1:
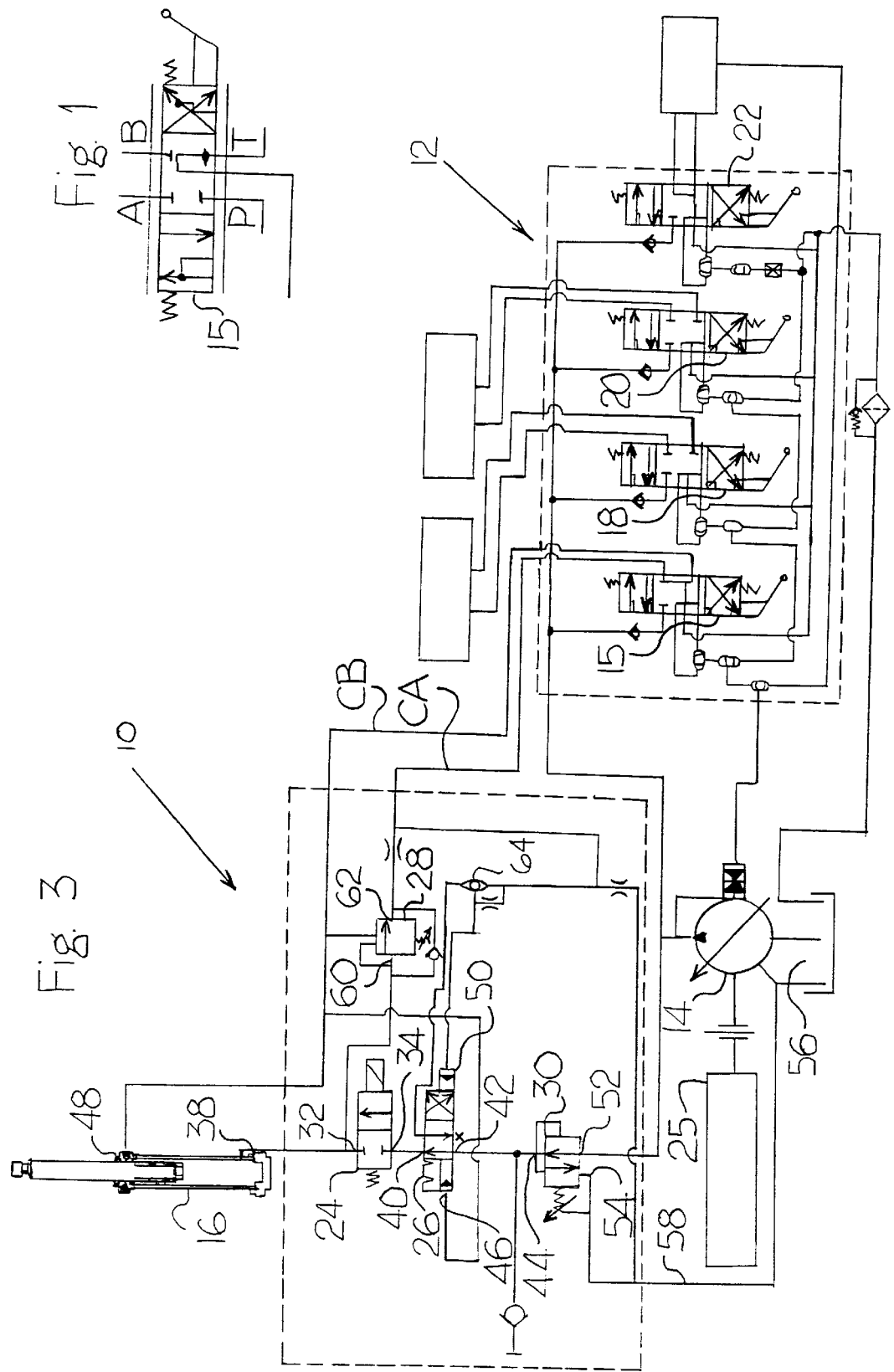
FIG. 1 is a schematic view of an all ports blocked type of load sensed proportional control valve.

The present application claims the benefit of U.S. Provisional Patent Application Serial No. 60/152,409, herein incorporated by reference in its entirety. FIG. 3 shows a first embodiment of the present invention, which generally includes a balance circuit 10, a load sensing valve bank 12, a load sensing pump 14 connected to the balance circuit 10, a hydraulic cylinder 16 connected to the balance circuit 10 and a plow lift and lower valve 15. The terms "load sensing" or "load sensed" are known to one skilled in the hydraulics art and are both generally defined as devices which are designed to maintain pump pressure over load pressure. The plow lift and lower valve 15, also known as a load sensed type of proportional control valve (shown in FIG. 2), is positioned in the load sensing valve bank 12, along with other hydraulic valves 18, 20, 22, such as those controlling plow angle (shown schematically), bed lift (shown schematically) and lower, and a spreader (shown schematically), respectively. The load sensing pump 14, which automatically alters fluid flow and pressure regardless of engine rpm, is driven by an engine 25 and has a bias or standby pressure preferably higher, such as 100 psi, over the preferred balance pressure, such as 600 psi. One type of load sensing pump 14 is a variable displacement axial piston pump available commercially.

As shown in FIG. 3, the balance circuit 10 generally includes a two-position solenoid valve 24, a two-position four-way valve 26 with detent, a counterbalance valve 28 with reverse freeflow check, a pressure reducing relieving valve 30, and a shuttle valve 64.

The two-position solenoid valve 24 is preferably spring loaded in a closed position and has an inlet port 32, an outlet port 34, and an electrically or mechanically activated solenoid (shown schematically). The inlet port 32 of the two-position solenoid valve 24 is connected to a blind end 38 of the hydraulic cylinder 16 and the plow lift and lower valve 15 in the load sensing valve bank 12. The two-position solenoid valve 24, which is preferably activated from inside the vehicle, turns the plow balance circuit 10 either on or off.

A second port 40 of the pilot operated two-position four-way valve 26 is connected to the outlet port 34 of the two-position solenoid valve 24. A first port 42 of the two-position four-way valve 26 is connected to a second relief port 44 of the pressure reducing relieving valve 30.

The two-position four-way valve 26 is piloted at a first input 46 by a connection to the plow lift and lower valve 15 in the load sensing valve bank 12 and a rod end 48 of the hydraulic cylinder 16. A second input 50 is connected to a shuttle valve 64, with shuttle valve 64 also fluidly connected to the lift and lower valve 15, the two-position four-way valve 26, and a drain line 58. When no pilot pressure or force is applied to either the first input 46 or the second input 50, the two-position four-way valve 26 is in a static state. If a pilot pressure or force of a threshold value, such as 175 psi or greater, is applied to the first input 46, the two-position four-way valve 26 opens and allows fluid to flow through the first and second ports 40, 42. Subsequent pilot pressure or force to the second input 50 causes the two-position four-way valve 26 to close and remain closed, stopping all flow through the valve.

A pressure reducing relieving valve 30, having a an inlet port 52, a relieving port 54, and a second reduced pressure port 44, is preferably preset to the preferred balance pressure, such as 500 psi. The inlet port 52 of valve 30 is connected to the load sensing pump 14 and the load sensing valve bank 12. The relieving port 54 is connected to a hydraulic fluid reservoir 56. The pressure reducing relieving valve 30 allows discharge of fluid through a drain line 58 to the hydraulic fluid reservoir 56 when the preset value is exceeded.

The counterbalance valve 28, preferably having a pilot ratio, such as 4.5 to 1, is connected at a first end 60 between the two-position solenoid valve 24 and the blind end 38 of the plow hydraulic cylinder 16. A second end 62 is connected to the second input 50 of the two-position four-way valve 26 and the plow lift and lower valve 15 in the load sensing valve bank 12.

1. Lifting and Lowering Without Balancing

If a plow is plowing dense or heavy material, such as hardpack snow, it may be desirable to rest the entire weight of the plow on the ground. Alternatively, the plow may be raised during summer months or as otherwise required. The plow is raised or lowered using the load sensing valve bank 12. The balance circuit 10, with the exception of the counterbalance valve 28, is not activated during the raising or lowering of the plow because the two-position solenoid valve 24 is not activated and is therefore in the closed default position.

In raising the plow from a position on the ground, a switch, handle, or other device inside the vehicle is activated, releasing pressurized fluid from the plow lift and lower valve 15 in the load sensing valve bank 12, along line CA. Fluid pressure or force pilots the second input 50 of the two-position four-way valve 26, closing the valve 26, but there is no net effect on the system because the two-position solenoid valve 24 is closed. Fluid also travels through the counterbalance valve 28 and into blind end 38 of the hydraulic cylinder 16, filling the hydraulic cylinder 16 from the blind end 38. No fluid enters the two-position solenoid valve 24 because the two-position solenoid valve 24 is closed. Fluid in the rod end 48 of the hydraulic cylinder 16 transports along line CB flowing through the plow lift and lower valve 15 and into the hydraulic fluid reservoir 56.

Once the plow is raised, vibrations, bumps, or obstructions in the road can cause the raised plow to bounce as the vehicle travels. This bouncing exerts additional force on the fluid in the hydraulic cylinder 16 and the fluid lines connected thereto. The counterbalance valve 28, much like the relieving section of the pressure reducing relieving valve 30, allows fluid to flow from the blind end 38 of the hydraulic cylinder 16 and through the counterbalance valve 28. The counterbalance valve 28 is remotely piloted from rod end 48 of the hydraulic cylinder 16 during low cycle causing flow and pressure at the blind end 38 of the hydraulic cylinder 16 to be relieved across the counterbalance valve 28 at a pressure higher than the set pressure of the pressure reducing relieving valve 30.

To lower the plow from a raised position, the vehicle operator selects the appropriate button, lever, or other device from inside the vehicle, releasing pressurized fluid from the plow lift and lower valve 15 in the load sensing valve bank 12, along line CB. Fluid flows into the rod end 48 of the hydraulic cylinder 16. The pressurized flow into the rod end 48 of the hydraulic cylinder 16, combined with the weight of the plow, allows the plow to lower toward the ground. Fluid in the blind end 38 of the hydraulic cylinder 16 exits through the counterbalance valve 28, back through the plow lift and lower valve 15, and into the hydraulic fluid reservoir 56. The counterbalance valve 28 helps control the descent of the plow load. It is noted that the reduction in pressure in line CA also causes the piloting of the first input 46 of the two-position four-way valve 26. The opening of this valve 26 has no effect on the system because the two-position solenoid valve 24 is still closed.

2. Balance On

The balance circuit 10 does not fully support the entire weight of the plow off the ground, only a portion of the overall weight. To operate the plow in a balance mode, the plow is lowered onto the ground, as described above, in preparation for plowing. Once the plow is resting on the ground, an operator activates a button, switch handle, or other device, preferably from inside a vehicle, to activate the two-position solenoid valve 24. This activation opens the two-position solenoid valve 24, allowing flow and pressure between the inlet port 32 and outlet port 34 of the two-position solenoid valve 24. The counterbalance valve 28 is not subjected to pilot pressure in the plow balance mode if the load sensing valve bank 12 and plow lift and lower valve 15 is in neutral, with the counterbalance valve 28 going to its preferred maximum set pressure.

3. Raising and Lowering in the Balance Mode

During normal plowing operations in the balanced mode, it may be necessary to lift and hold the plow as quickly as possible to avoid damage to property or persons. Vehicles operating wing plows are an example. In this instance, the balance circuit 10 can be immediately hydraulically disengaged by engaging the plow lift and lower valve 15, raising the plow upwards with respect to the ground, and holding the plow until the operator resumes the balance mode. By engaging the plow lift and lower valve 15, fluid is simultaneously pumped to the blind end 38 of the hydraulic cylinder 16 and to the second input 50 of the two-position four-way valve 26. Pilot pressure or force at the second input 50, in the absence of a corresponding pilot pressure or force at the first input 46, causes the two-position four-way valve 26 to close, preventing pressurized flow through the two-position four-way valve 26 and the pressure reducing relieving valve 30, but allowing pressurized flow into the blind end 38 of the hydraulic cylinder 16. The plow will remain in a positive hold position until the operator either disengages the plow balance system or lowers the plow to resume the plow balance mode of operation.

Plow balance is resumed (the plow lowers to its position before being temporarily raised) by momentarily activating the plow lift and lower valve 15 in the load sensing valve bank 12. This action momentarily pressurizes line CB, piloting the first input 46 of the two-position four-way valve 26 and allowing the pressurized flow to the rod end 48 of the hydraulic cylinder 16. With the two-position four-way valve 26 in an open position, the plow load exerts a force exceeding the preset load of the pressure reducing relieving valve 30, 500 psi for example, and fluid flows from the blind end 38 of the hydraulic cylinder 16, through the two-position solenoid valve 24, through the two-position four-way valve 26, and vents through the reservoir discharge port 54 into the hydraulic fluid reservoir 56. This causes the plow to lower towards the ground. As the plow begins to contact the ground, the ground begins to simultaneously support the weight of the plow. As the plow continues to lower, the support provided by the ground reduces the force exerted on the fluid inside the blind end 38 of the fluid cylinder 16. When the force exerted by the ground lowers the force exerted on the fluid in the blind end 38 to below the preset value of the pressure reducing relieving valve 30, balancing resumes. To end plow balance operations, the two-position solenoid valve 24 is turned off by the operator, using the electrically activated solenoid or other suitable device.

Figures 2, 4:
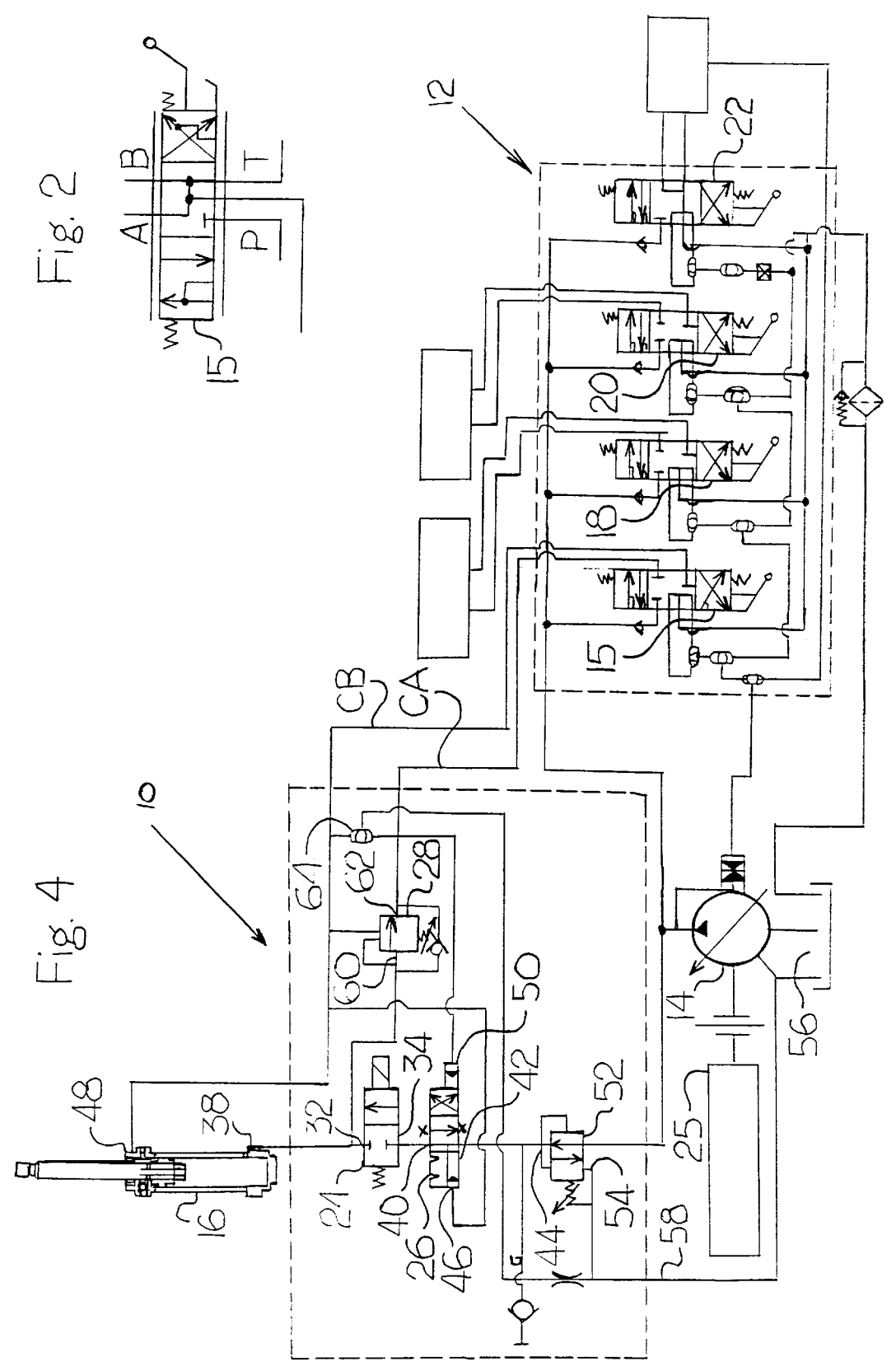

In a second embodiment, as shown in FIG. 4, a shuttle valve 64, having a movable float, moves in the direction of lower pressure. The shuttle valve 64 is used to release any entrapped pressure in the hydraulic cylinder 16 rod end 48 and blind end 38 hydraulic lines, caused by closed valves. In addition, the drain line has a reduced diameter, such as 0.046", and the plow lift and lower valve 15 is ported differently. The plow lift and lower valve 15, as shown in FIGS. 1 and 4, is an all ports blocked type of load sensed proportional control valve, wherein the plow lift and lower valve 15, shown in FIGS. 2 and 3, is a P blocked, A and B to T configuration.

Figure 5:
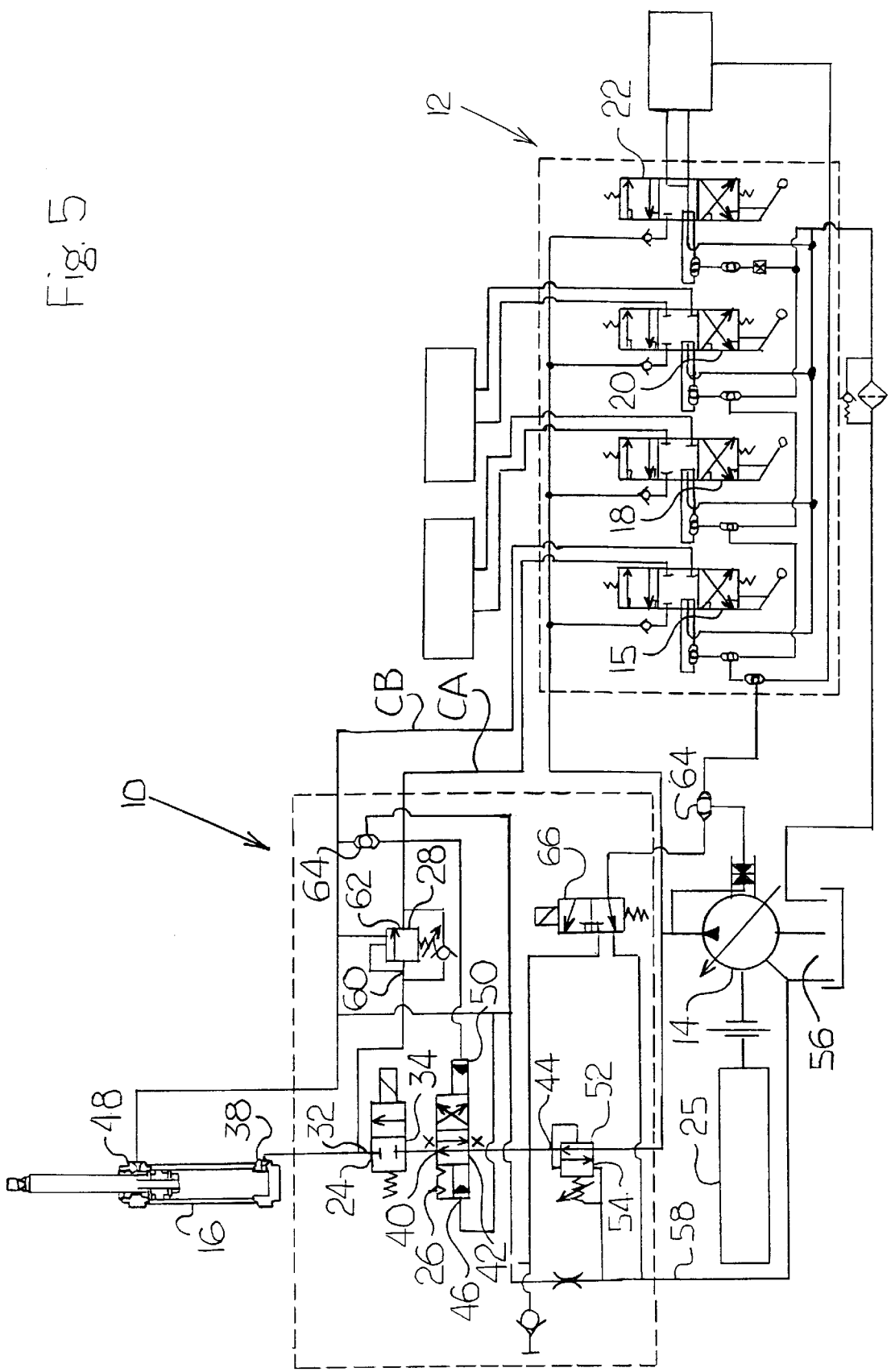
FIG. 5 is a schematic view of the hydraulic system shown in FIG. 3, with a shuttle valve, reduced diameter drain line, two-position three-way solenoid valve, and a connection modification made to a plow lift and lower valve in the load sensing valve bank added to the balance circuit, with the shuttle valve connected to the two-position three-way solenoid valve.

A third embodiment, shown in FIG. 5, is an adaptation for automatically setting the load sensing pump 14 bias to the value of the balance system. A two-position solenoid valve 66 is energized in conjunction with the two-position solenoid valve 24. Shuttle valve 64 selects the highest pressure and directs the pressure to a load sense signal port of the load sensing pump 14. In FIGS. 3 and 4, the load sensing pump 14 standby or bias is preferably set at a threshold value, such as 600 psi. A normal live power load sense system standby pressure would generally be 200 to 300 psi. FIG. 5, which is similar to FIG. 4, uses the second two-position three-way solenoid valve 66 to turn the increased standby pressure on and off in direct reference to the setting of the plow balance system. The standby pressure may remain at 200 to 300 psi and is automatically raised to the setting of the balance circuit 10 only when activated to plow balance on. The plow lift and lower value 15 is shown in FIGS. 1 and 5.

As shown in the preferred and other embodiments, the present invention lessens blade cutting edge friction of plows by supporting a proportional amount of plow weight. The present invention allows an operator to raise a plow or other attachment while in a balance mode. These features generally help preserve cutting edge life, road surfaces, and other property.

The invention has been described with reference to the preferred embodiments. Obvious modifications and alterations will occur to others upon reading and understanding the preceding detailed description. It is intended that the invention be construed as including all such modifications and alterations.

I claim:

1. A plow system comprising:

a plow vehicle;

a hydraulic cylinder positioned adjacent said plow vehicle;

a plow positioned adjacent said hydraulic cylinder, a balance circuit fluidly connected to said hydraulic cylinder;

a pump fluidly connected to said balance circuit; and a load sensing valve bank fluidly connected to said balance circuit and said pump, said load sensing valve bank further comprising a lift and lower valve selected from the group consisting of an all ports blocked load sensed proportional control valve and a P blocked, A and B to T configuration valve.

2. The plow system as claimed in claim 1 wherein said pump is a load sensing pump.

3. The plow system as claimed in claim 1 wherein said balance circuit includes a valve selected from the group consisting of a two-position solenoid valve, a two-position three way solenoid valve, a two-position four-way valve with detent, a counterbalance valve with reverse freeflow check, a pressure reducing relieving valve, and a shuttle valve.

4. The plow system as claimed in claim 3 further comprising a drain line and a fluid reservoir, said drain line fluidly connected to a relieving port of said pressure reducing relieving valve, said fluid reservoir, and a shuttle valve.

5. The plow system as claimed in claim 3 further comprising a drain line, wherein said drain line has a reduced internal diameter portion positioned between a relieving port of said pressure reducing relieving valve and a shuttle valve.

6. The plow system as claimed in claim 1 further comprising a drain line and a fluid reservoir, said drain line fluidly connected to a relieving port of said pressure reducing relieving valve and said fluid reservoir.

7. An apparatus for balancing a plow comprising:

a balance circuit;

a pump fluidly connected to said balance circuit; and a load sensing valve bank fluidly connected to said balance circuit and said pump, wherein said load sensing valve bank further comprises a lift and lower valve and said lift and lower valve is an all ports blocked load sensed proportional control valve.

8. The apparatus for balancing a plow as claimed in claim 7 wherein said balance circuit includes a valve selected from the group consisting of a two-position solenoid valve, a two-position three way solenoid valve, a two-position four-way valve with detent, a counterbalance valve with reverse freeflow check, a pressure relieving valve, and a shuttle valve.

9. The apparatus balancing a plow as claimed in claim 7 further comprising a hydraulic cylinder fluidly connected to said balance circuit, said pump, and said load sensing valve bank.

10. The apparatus for balancing a plow as claimed in claim 7 wherein said pump is a load-sensing pump.

11. The for balancing a plow as claimed in claim 7 wherein said lift and lower valve is a P blocked, A and B to T configuration valve.

12. An apparatus for balancing a plow comprising:

a balance circuit;

a pump fluidly connected to said balance circuit; and a load sensing valve bank fluidly connected to said balance circuit and said pump, wherein said load sensing valve bank further comprises a lift and lower valve and said lift and lower valve is a P blocked, A and B to T configuration valve.

13. A plow system comprising:

a plow vehicle;

a hydraulic cylinder positioned adjacent said plow vehicle;

a plow positioned adjacent said hydraulic cylinder, a balance circuit fluidly connected to said hydraulic cylinder, said balance circuit further comprising a valve selected from the group consisting of a two-position solenoid valve, a two-position three way solenoid valve, a two-position four-way valve with detent, a counterbalance valve with reverse freeflow check, a pressure reducing relieving valve, and a shuttle valve;

a pump fluidly connected to said balance circuit;

a load sensing valve bank fluidly connected to said balance circuit and said pump; and a drain line fluidly connected to a relieving port of said pressure-reducing relieving valve and a fluid reservoir;

wherein said drain line has a reduced internal diameter portion positioned between a relieving port of said pressure reducing relieving valve and a shuttle valve.

* * * * *

UNITED STATES PATENT AND TRADEMARK OFFICE
CERTIFICATE OF CORRECTION

PATENT NO. : 6,467,553 B1
DATED : October 22, 2002
INVENTOR(S) : James R. Wojanis It is certified that error appears in the above-identified patent and that said Letters Patent is hereby corrected as shown below:

Column 4,
Line 37, "having a an inlet" should read -- having an inlet --.

Column 7,
Line 35, "three way" should read -- three-way -- (insert hyphen).

Column 8,
Line 20, "The for" should read -- The apparatus for --.

Signed and Sealed this

Eighth Day of April, 2003

JAMES E. ROGAN
*Director of the United States Patent and Trademark Office*